United States Patent
Eshima

(10) Patent No.: US 8,731,302 B2
(45) Date of Patent: May 20, 2014

(54) MOVING IMAGE EXTRACTING APPARATUS, PROGRAM AND MOVING IMAGE EXTRACTING METHOD

(75) Inventor: Masashi Eshima, Tokyo (JP)

(73) Assignee: Sony Corporation, Tokyo (JP)

( * ) Notice: Subject to any disclaimer, the term of this patent is extended or adjusted under 35 U.S.C. 154(b) by 246 days.

(21) Appl. No.: 12/796,126

(22) Filed: Jun. 8, 2010

(65) Prior Publication Data

US 2011/0026766 A1 Feb. 3, 2011

(30) Foreign Application Priority Data

Jul. 29, 2009 (JP) ................. 2009-176575

(51) Int. Cl.
- *G06K 9/00* (2006.01)
- *G06K 9/46* (2006.01)
- *G06K 9/66* (2006.01)

(52) U.S. Cl.
USPC .......................................... 382/190; 382/103

(58) Field of Classification Search
None
See application file for complete search history.

(56) References Cited

U.S. PATENT DOCUMENTS

| | | | |
|---|---|---|---|
| 2007/0092110 A1* | 4/2007 | Xu et al. | 382/103 |
| 2008/0118108 A1* | 5/2008 | Sharon et al. | 382/103 |
| 2009/0196569 A1* | 8/2009 | Agnihotri et al. | 386/52 |

FOREIGN PATENT DOCUMENTS

JP 2004-159331 6/2004

OTHER PUBLICATIONS

Yin et al., "Likelihood Map Fusion for Visual Object Tracking", Jan. 9, 2008, IEEE Workshop on Applications of Computer Vision, 2008, p. 1-7.*
Adiv, "Determining Three-Dimensional Motion and Structure from Optical Flow Generated by Several Moving Objects", Jul. 1985, IEEE Transactions on Pattern Analysis and Machine Intelligence, vol. PAMI-7, iss. 4, p. 384-401.*

* cited by examiner

*Primary Examiner* — Stephen R Koziol
*Assistant Examiner* — Timothy Choi
(74) *Attorney, Agent, or Firm* — Oblon, Spivak, McClelland, Maier & Neustadt, L.L.P.

(57) ABSTRACT

There is provided a moving image extracting apparatus including a movement detecting unit which detects movement of an imaging apparatus at the time when imaging a moving image based on the moving image imaged by the imaging apparatus, an object detecting unit which detects an object from the moving image, a salient object selecting unit which selects an object detected by the object detecting unit over a period of predetermined length or longer as a salient object within a segment in which movement of the imaging apparatus is detected by the movement detecting unit, and an extracting unit which extracts a segment including the salient object selected by the salient object selecting unit from the moving image.

8 Claims, 18 Drawing Sheets

FIG. 7
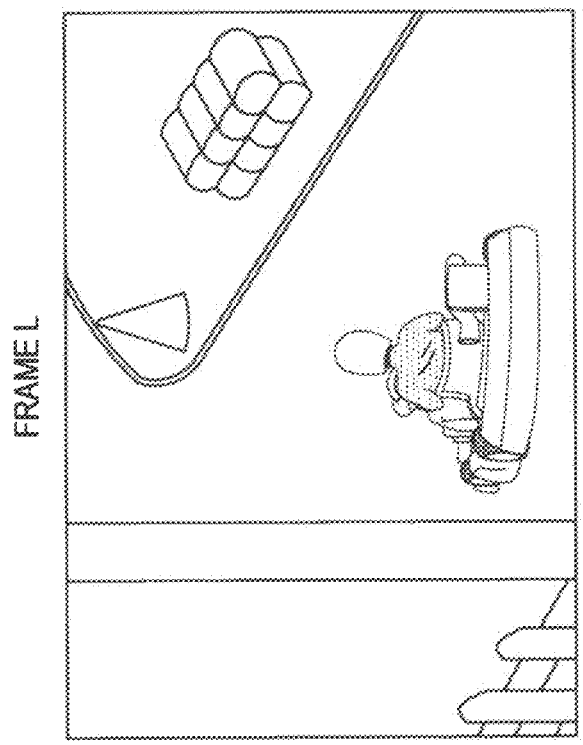
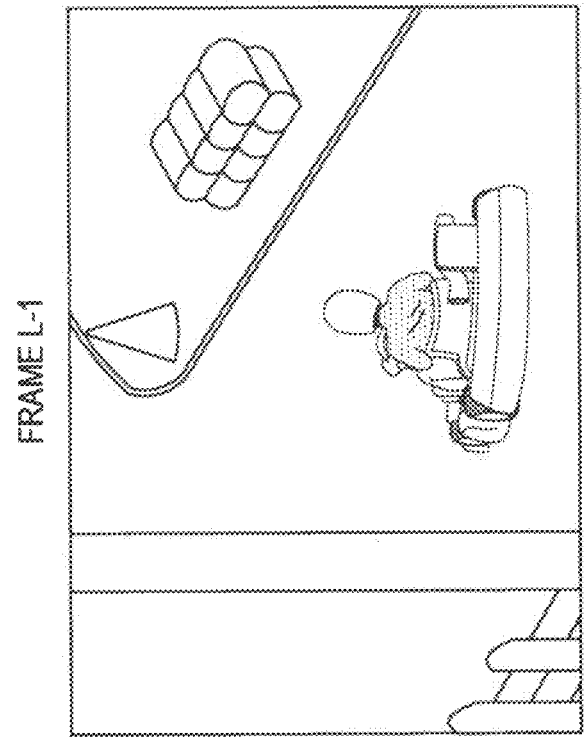

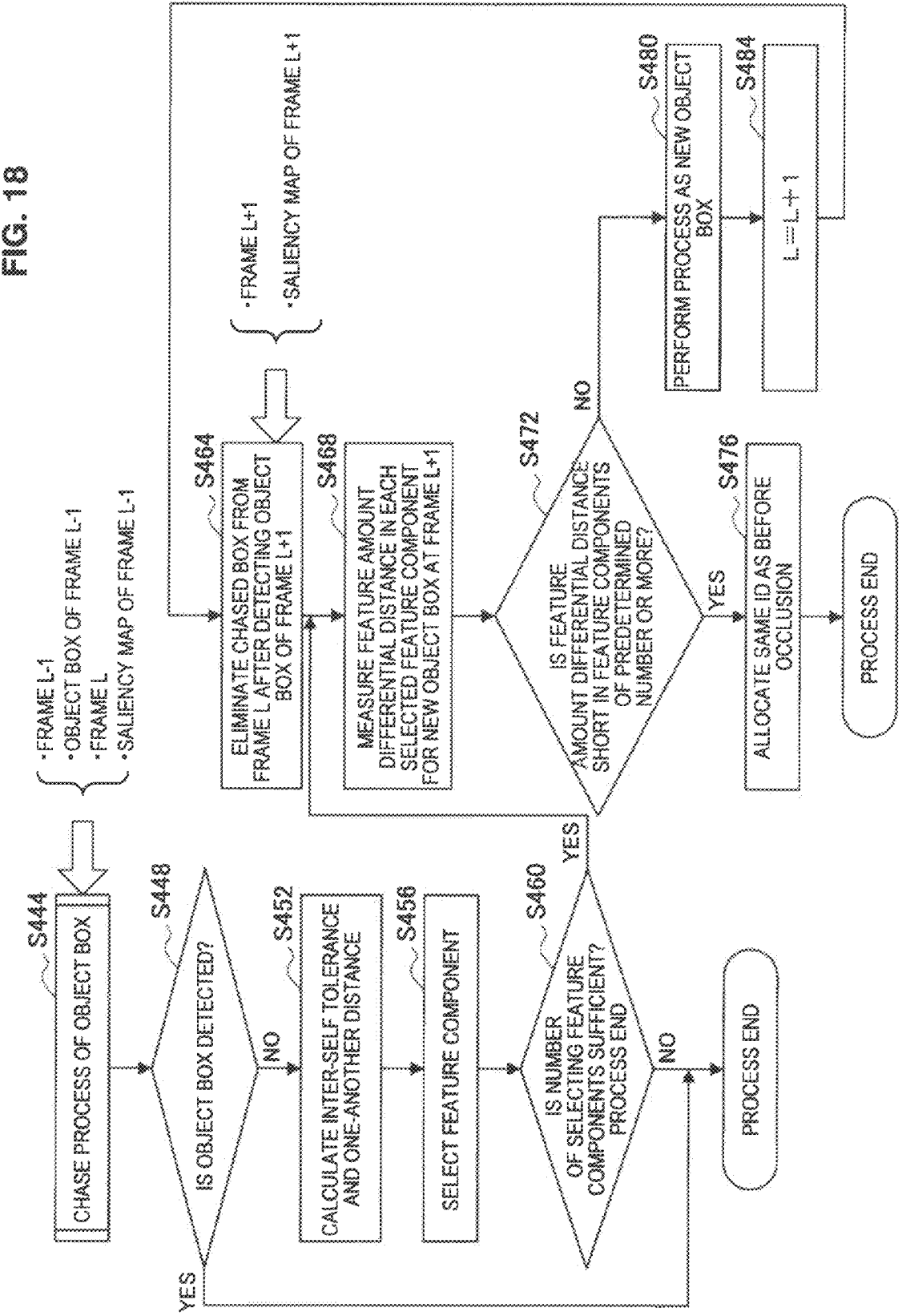

MOVING IMAGE EXTRACTING APPARATUS, PROGRAM AND MOVING IMAGE EXTRACTING METHOD

BACKGROUND OF THE INVENTION

1. Field of the Invention

The present invention relates to a moving image extracting apparatus, a program and a moving image extracting method.

2. Description of the Related Art

Recently, an imaging device capable of taking a moving image by converting incident light into electrical signals has been widely spread. With this imaging device, a user can keep scenes of an athletic festival of children, travel scenes and scenes of a pet as a moving image.

Further, software for automatic editing to prepare a short movie by extracting a segment from a moving image obtained by the imaging device has been proposed. With this software for automatic editing, an extraction segment of the moving image is determined at random, for example. An example of such software for automatic editing of a moving image has been disclosed in Japanese Patent Application Laid-Open No. 2004-159331.

SUMMARY OF THE INVENTION

However, with the above software for automatic editing, since the extraction segment of the moving image is determined at random, for example, it has been difficult to extract a desired segment for a user. For example, in the movie of the athletic festival, it is considered that a part where the child is running is the most desirable. However, there may be a case that the above software for automatic editing extracts a part of the moving image in which a child waited queuing up in the row before the child played a game.

In light of the foregoing, it is desirable to provide a novel and improved moving image extracting apparatus, a program and a moving image extracting method capable of performing segment extraction from a moving image in accordance with content of the moving image.

According to an embodiment of the present invention, there is provided a moving image extracting apparatus including a movement detecting unit which detects movement of an imaging apparatus at the time when imaging a moving image based on the moving image imaged by the imaging apparatus, an object detecting unit which detects an object from the moving image, a salient object selecting unit which selects an object detected by the object detecting unit over a period of predetermined length or longer as a salient object within a segment in which movement of the imaging apparatus is detected by the movement detecting unit; and an extracting unit which extracts a segment including the salient object selected by the salient object selecting unit from the moving image.

The movement detecting unit may detect the movement of the imaging apparatus based on the difference between two sequential frames among frames constituting the moving image.

The object detecting unit may convert a first frame being one of the two sequential frames by utilizing the movement of the imaging apparatus detected by the movement detecting unit, and detect the object through a differential part between a second frame being the other frame of the two sequential frames and the first frame after being converted.

The moving image extracting apparatus further including an identical object determining unit which compares an object newly detected by the object detecting unit and an object disappeared in a past frame and determines whether or not both of the objects are identical. an object which is determined to be identical by the identical object determining unit may be treated as being detected during the period of disappearance as well.

The identical object determining unit may includes a feature component selecting unit which selects a feature component corresponding to the object disappeared in the past frame and a comparing unit which compares the newly detected object and the object disappeared in the past frame in the feature component selected by the feature component selecting unit.

The feature component selecting unit may select a feature component distinguishable for the object from another object in plural frames before disappearance of the object among plural types of feature components.

According to another embodiment of the present invention, there is provided a program for causing a computer to function as a movement detecting unit which detects movement of an imaging apparatus at the time when imaging a moving image based on the moving image imaged by the imaging apparatus, an object detecting unit which detects an object from the moving image, a salient object selecting unit which selects an object detected by the object detecting unit over a period of predetermined length or longer as a salient object within a segment in which movement of the imaging apparatus is detected by the movement detecting unit and an extracting unit which extracts a segment including the salient object selected by the salient object selecting unit from the moving image.

A moving image extracting method including the steps of detecting movement of an imaging apparatus at the time when imaging a moving image based on the moving image imaged by the imaging apparatus, detecting an object from the moving image, selecting an object detected over a period of predetermined length or longer as a salient object within a segment in which movement of the imaging apparatus is detected, and extracting a segment including the salient object from the moving image.

According to the moving image extracting apparatus, the program and the moving image extracting method of the present invention described above, segment extraction from a moving image can be performed in accordance with a content of the moving image.

BRIEF DESCRIPTION OF THE DRAWINGS

FIG. 7 is an explanatory view which illustrates two sequential frames;

FIG. 18 is a flowchart which describes the flow of processes to support occlusion by a managing unit.

DETAILED DESCRIPTION OF THE EMBODIMENT(S)

Figure 1:
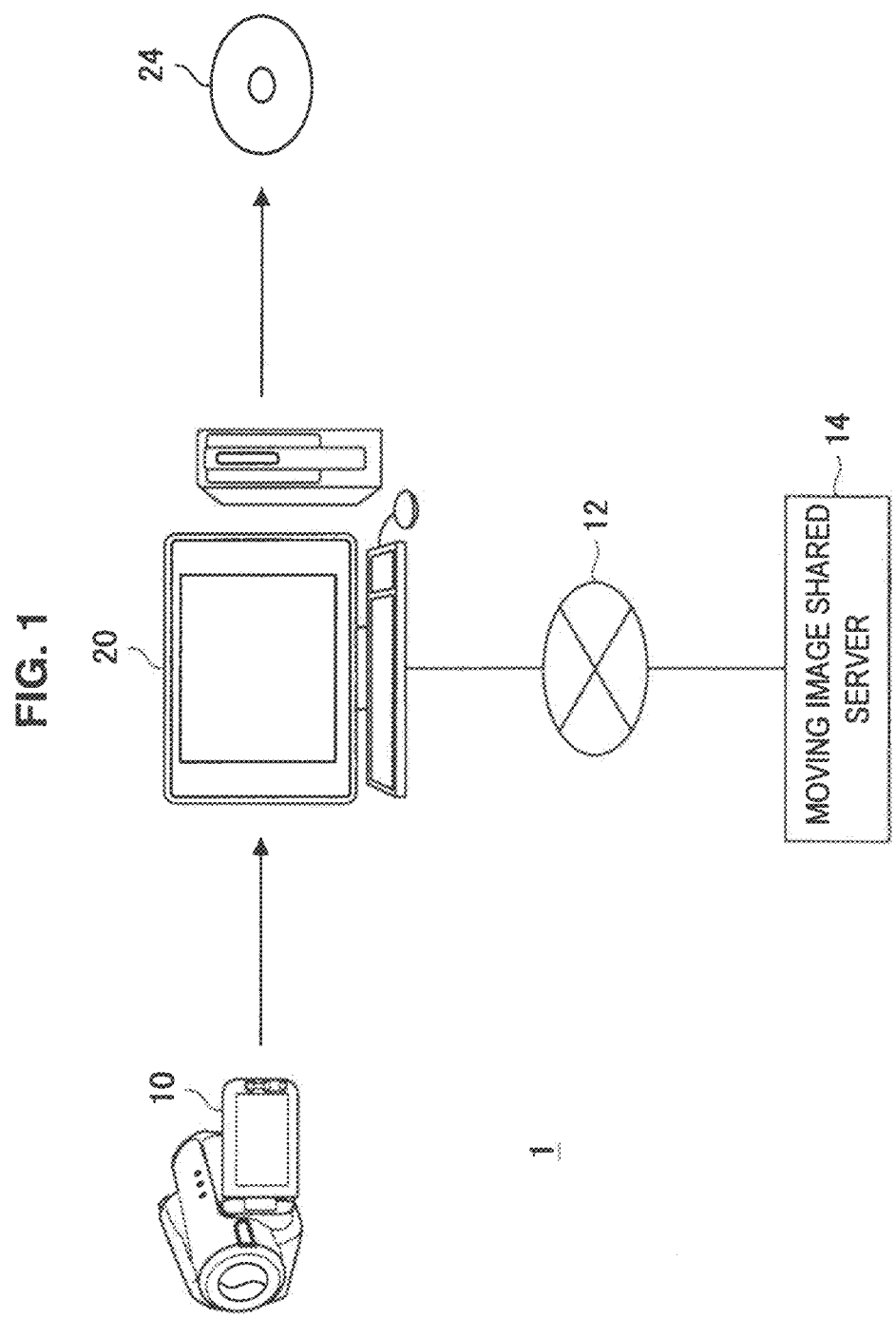
FIG. 1 is an explanatory view which illustrates a configuration example of an image extracting system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Embodiments of the present invention will be described in the following order.
1. Outline of image extracting apparatus
2. Configuration of image extracting apparatus
3. Operation of image extracting apparatus
   3-1. Detecting movement of imaging apparatus
   3-2. Detecting moving zone
   3-3. Chasing object
   3-4. Process of supporting occlusion
4. Summary

1. OUTLINE OF IMAGE EXTRACTING APPARATUS

First, a moving image extracting apparatus 20 according to an embodiment of the present invention will be schematically described with reference to FIG. 1 to 3.

FIG. 1 is an explanatory view of a configuration example of an image extracting system 1 according to an embodiment of the present invention. As illustrated in FIG. 1, the image extracting system 1 includes an imaging device 10, a communication network 12, a moving image shared server 14 and the moving image extracting apparatus 20.

The imaging device 10 obtains a moving image including a plurality of frames by converting incident light into electrical signals. Further, the imaging device 10 stores the obtained moving image to a storage medium mounted integrally on the imaging device 10 or a storage medium attached to the imaging device 10 in a detachably attachable manner. Here, the imaging device 10 may start obtaining a moving image based on recording start operation of a user and may end obtaining the moving image based on recording end operation of the user.

The moving image extracting apparatus 20 obtains the moving image taken by imaging with the imaging device 10. For example, the moving image extracting apparatus 20 may have a storage medium having the moving image recorded and may obtain the moving image from the storage medium. Instead, the imaging device 10 may transmit a moving image by wired or wireless and the moving image extracting apparatus 20 may receive the moving image transmitted from the imaging device 10.

In FIG. 1, a personal computer (PC) is illustrated as an example of the moving image extracting apparatus 20. However, the moving image extracting apparatus 20 is not limited to a PC. For example, the moving image extracting apparatus 20 may be an information processing apparatus such as a home video processing apparatus (a DVD recorder, a video-cassette recorder and the like), a personal digital assistant (PDA), home game equipment and a home electrical appliance. Further, the moving image extracting apparatus 20 may be an information processing apparatus such as a cellular phone, a personal handyphone system (PHS), a portable music player, a portable video processing device and portable game equipment. Moreover, the imaging apparatus 10 can be implemented by functions of the image extracting apparatus 20.

The image extracting apparatus 20 extracts a segment from the obtained moving image. For example, the image extracting apparatus 20 extracts a segment including a salient object imaged with chasing by the imaging apparatus 10 from the moving image. In the following, the extraction segment of the moving image by the image extracting apparatus 20 and operation of the image extracting apparatus 20 will be schematically described with reference to FIGS. 2 and 3.

Figure 2:
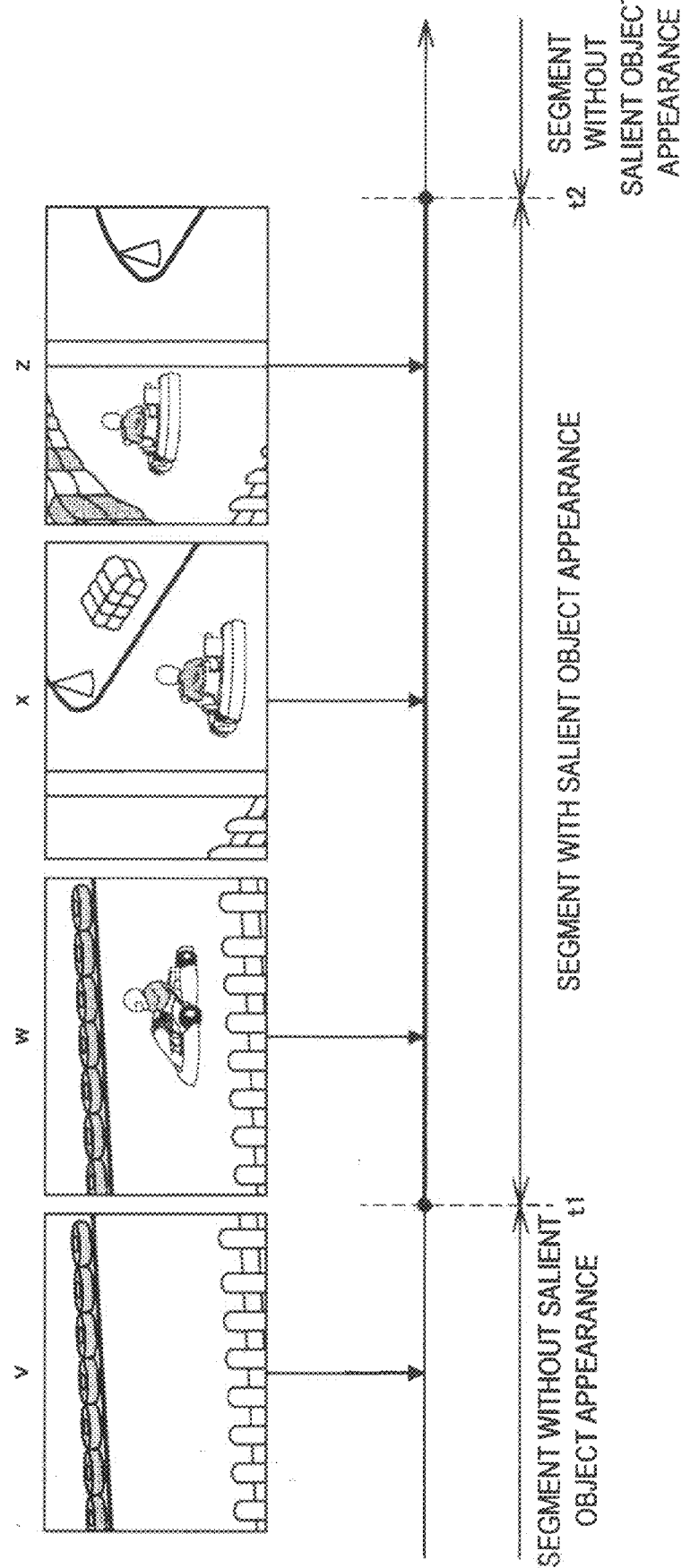
FIG. 2 is an explanatory view which illustrates an extraction segment of a moving image with an image extracting apparatus according to an embodiment of the present invention.

FIG. 2 is an explanatory view illustrating an extraction segment of a moving image by the image extracting apparatus 20 according to an embodiment of the present invention. As illustrated in FIG. 2, a frame v includes an image of a circuit course and frames w to z include the circuit course as a background image and a cart driving on the circuit course. Here, the image of the cart included in the frames w to z is an object imaged with chasing (i.e., imaged while being chased) by the imaging apparatus 10 for a predetermined time or longer. As illustrated in FIG. 3, the image extracting apparatus 20 according to the present embodiment selects the object imaged with chasing for the predetermined time or longer as described above as a salient object and extracts a segment including the salient object from the moving image.

Figure 3:
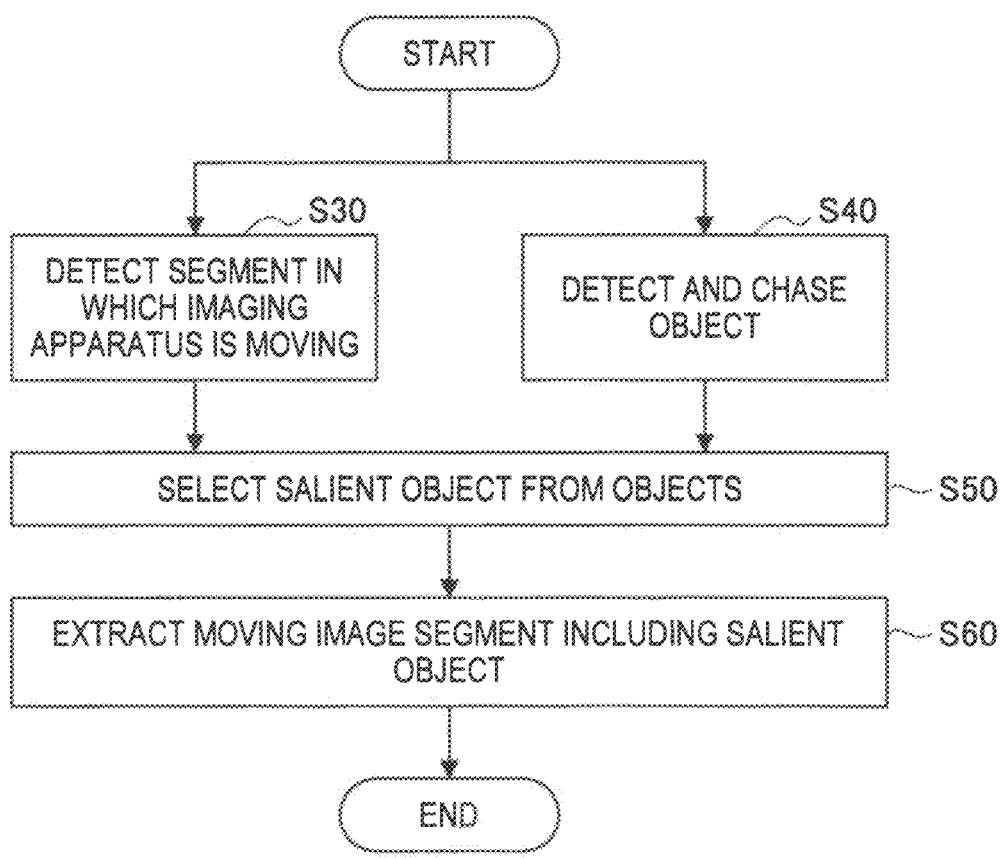
FIG. 3 is a flowchart which describes schematic operation of the image extracting apparatus according to an embodiment of the present invention.

FIG. 3 is a flowchart describing schematic operation of the image extracting apparatus 20 according to an embodiment of the present invention. As illustrated in FIG. 3, the image extracting apparatus 20 detects a segment in which the imaging apparatus 10 is moving from respective frames constituting the moving image (S30). Here, a segment in which the position of the imaging apparatus 10 is moving and a segment in which an imaging direction of the imaging apparatus 10 is changing are considered to be the segment in which the imaging apparatus 10 is moving. Based on the detection, the frame number of the segment in which the imaging apparatus 10 is detected to be moving is obtained.

Further, the image extracting apparatus 20 performs detecting and chasing of the object from the respective frames constituting the imaged moving image (S40). Based on the detection and chase, object information constituted with an object ID, an appearance frame number and a disappearance frame number is obtained as the number of objects.

Then, the image extracting apparatus 20 selects the salient object from the objects based on the segment in which the imaging apparatus 10 detected in S30 is moving and the object information obtained in S40 (S50). Specifically, the image extracting apparatus 20 selects, as the salient object, an object detected over a period of the predetermined length or longer within the segment in which movement of the imaging apparatus 10 is detected. Further, the image extracting apparatus 20 extracts a moving image segment including the salient object from the moving image (S60).

The image extracting apparatus 20 may store the moving image extracted as described above to an internal storage medium, may store to the removable storage medium 24 or may transmit to the moving image shared server 14 via the communication network 12. Here, the moving image transmitted to the moving image shared server 14 can be watched and listened at a plurality of information processing apparatuses connected to the communication network 12.

The communication network 12 is a wired or wireless transmission path of information transmitted from the apparatuses connected to the communication network 12. For example, the communication network 12 may include a public line network such as the internet, a telephone line network and a satellite communication network, a variety of local area networks (LAN) including Ethernet (a registered trademark), and a wide area network (WAN). Further, the communication network 12 may include a private line network such as an internet protocol-virtual private network (IP-VPN).

2. CONFIGURATION OF IMAGE EXTRACTING APPARATUS

In the above, the image extracting apparatus 20 according to the present embodiment has been schematically described with reference to FIGS. 1 to 3. Next, the configuration of the image extracting apparatus 20 according to the present embodiment will be described in detail with reference to FIGS. 4 to 14.

(Hardware Configuration of Image Extracting Apparatus 20)

Figure 4:
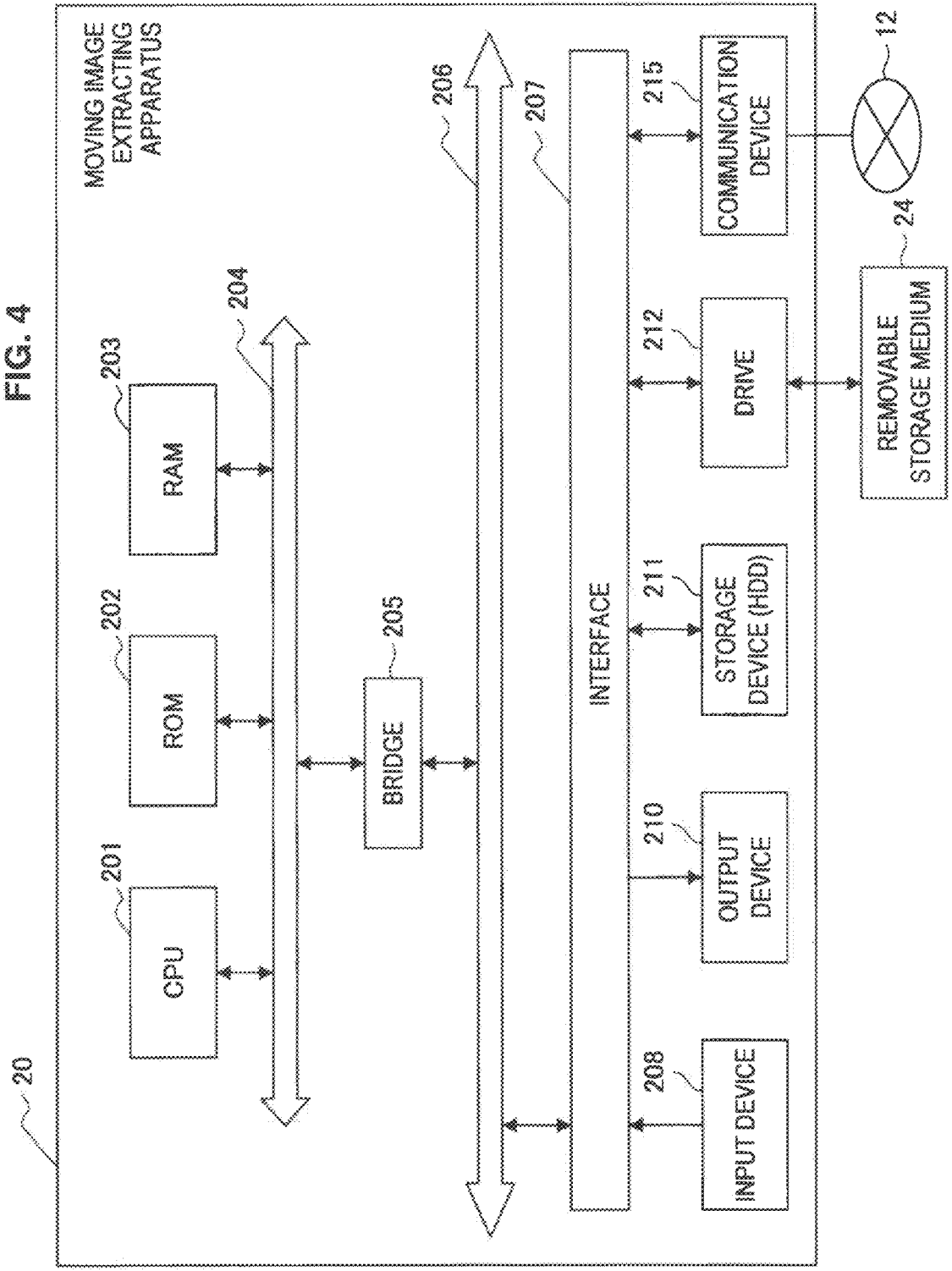
FIG. 4 is a block diagram which illustrates a hardware configuration of the image extracting apparatus.

FIG. 4 is a block diagram illustrating the hardware configuration of the moving image extracting apparatus 20. The moving image extracting apparatus 20 includes a central processing unit (CPU) 201, a read only memory (ROM) 202, a random access memory (RAM) 203 and a host bus 204. In addition, the moving image extracting apparatus 20 includes a bridge 205, an external bus 206, an interface 207, an input device 208, an output device 210, a storage device (HDD) 211, a drive 212 and a communication device 215.

The CPU 201 functions as an arithmetic processing unit and a controlling unit and controls general operation in the moving image extracting apparatus 20 in accordance with a variety of programs. The CPU 201 may be a microprocessor. The ROM 202 stores the programs and arithmetic parameters to be used by the CPU 201. The RAM 203 temporarily stores programs to be used during the operation of the CPU 201, parameters to vary appropriately during the operation thereof and the like. These are mutually connected by the host bus 204 constituted with a CPU bus and the like.

The host bus 204 is connected to the external bus 206 such as a peripheral component interconnect/interface (PCI) bus via the bridge 205. Here, it is not necessary to separately constitute the host bus 204, the bridge 205 and the external bus 206. The functions thereof may be mounted on a single bus.

The input device 208 is constituted with an input means such as a mouse, a keyboard, a touch panel, a button, a microphone, a switch and a lever to input information by a user, and an input controlling circuit to generate an input signal based on the input by the user and to output the signal to the CPU 201. The user of the moving image extracting apparatus 20 can input a variety of data and instruct process operation by operating the input device 208.

The output device 210 includes a display device such as a cathode ray tube (CRT) display device, a liquid crystal display (LCD) device, an organic light emitting diode (OLED) device and a lamp. Further, the output device 210 includes an audio output device such as a speaker and a headphone. The output device 210 outputs a reproduced content, for example. Specifically, the display device displays various types of information such as reproduced video data with texts or images. Meanwhile, the audio output device converts reproduced audio data and the like into audio and outputs the audio.

The storage device 211 is a device for data storage configured to be an example of a memory unit of the moving image extracting apparatus 20 according to the present embodiment. The storage device 211 may include a storage medium, a recording device to record data at the storage medium, a reading device to read the data from the storage medium, and a deleting device to delete the data recorded at the storage medium. The storage device 211 is configured with a hard disk drive (HDD), for example. The storage device 211 drives the hard disk and stores programs to be executed by the CPU 201 and a variety of data.

The drive 212 is a reader/writer for the storage medium and is incorporated by or externally attached to the moving image extracting apparatus 20. The drive 212 reads the information stored at a mounted removal storage medium 24 such as a magnetic disk, an optical disk, a magneto-optical disk and a semiconductor memory and outputs the information to the RAM 203. The drive 212 can write information onto the removal storage medium 24.

The communication device 215 is a communication interface constituted with a communication device and the like to be connected to a communication network 12, for example. Here, the communication device 215 may be a wireless local area network (LAN) compatible communication device, a wireless USB compatible communication device or a wired communication device to perform communication with a cable.

(Functional Configuration of Image Extracting Apparatus 20)

Figure 5:
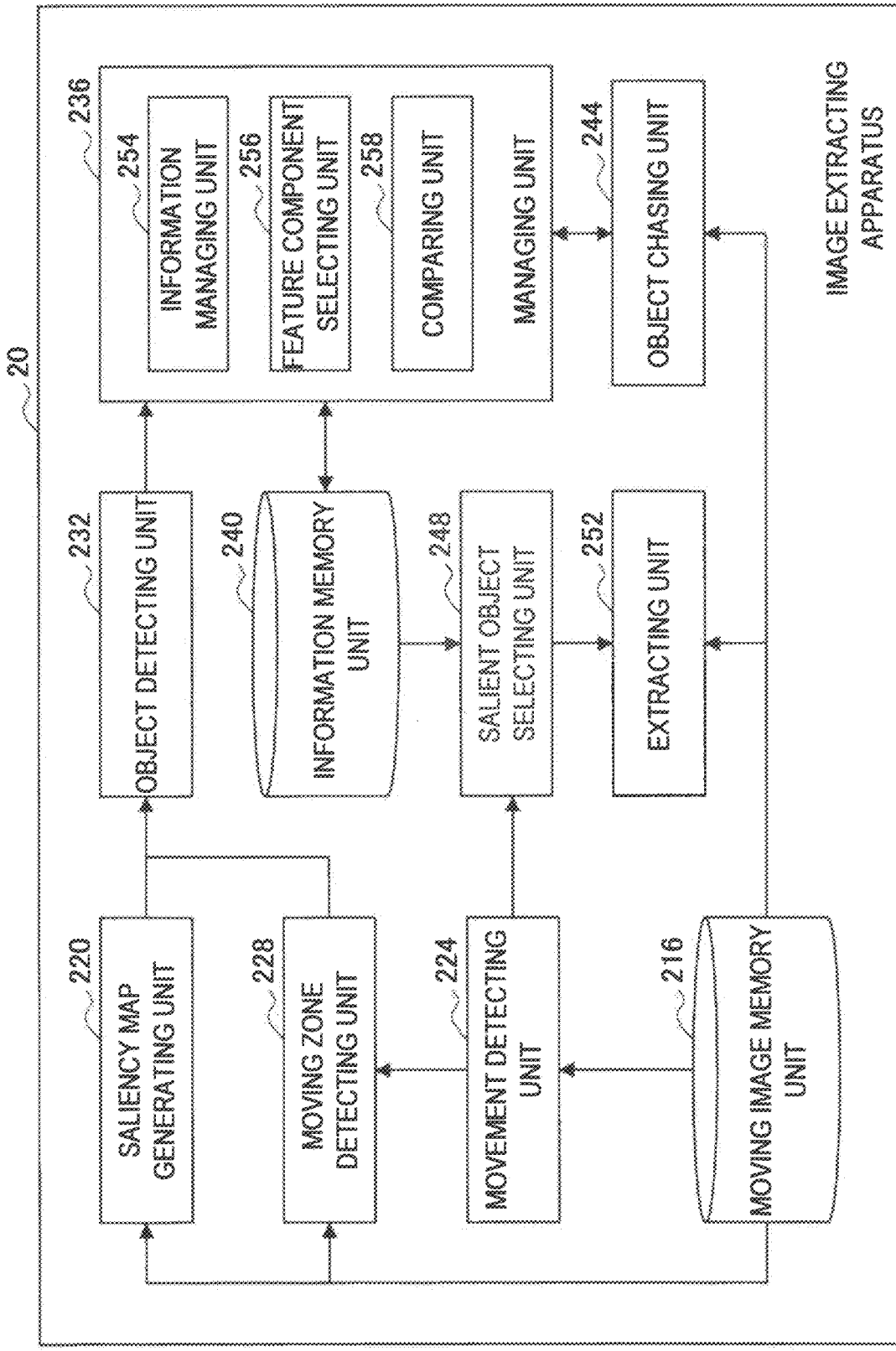
FIG. 5 is a functional block diagram which illustrates the configuration of the image extracting apparatus according to an embodiment of the present invention.

FIG. 5 is a functional block diagram illustrating the configuration of the image extracting apparatus 20 according to an embodiment of the present invention. As illustrated in FIG. 5, the image extracting apparatus 20 includes a moving image memory unit 216, a saliency map generating unit 220, a movement detecting unit 224, a moving zone detecting unit 228, an object detecting unit 232, a managing unit 236, an information memory unit 240, an object chasing unit 244, an salient object selecting unit 248 and an extracting unit 252.

(Moving Image Memory Unit 216)

The moving image memory unit 216 is a storage medium storing a moving image imaged by the imaging apparatus 10. The moving image memory unit 216 may be a storage medium of a non-volatile memory, a magnetic disk, an optical disk, a magneto-optical (MO) disk and the like. For example, an electrically erasable programmable read-only memory (EEPROM) and an erasable programmable read-only memory (EPROM) may be adopted as the non-volatile memory. A hard disk and a discoidal magnetic disk may be adopted as the magnetic disk. Further, a compact disc (CD), a digital versatile disc recordable (DVD-R) and a Blu-Ray Disc (BD, a registered trademark) may be adopted as the optical disk.

(Saliency Map Generating Unit 220)

The saliency map generating unit 220 generates a saliency map for each frame constituting the moving image supplied from the moving image memory unit 216. More specifically, the saliency map generating unit 220 generates plural types of feature amount maps from the respective frames and generates the saliency map by unifying the plural types of feature amount maps. Each feature amount map indicates distribution of each feature amount of each frame. In the following, the feature amount map and the saliency map are specifically described with reference to FIG. 6.

Figure 6:
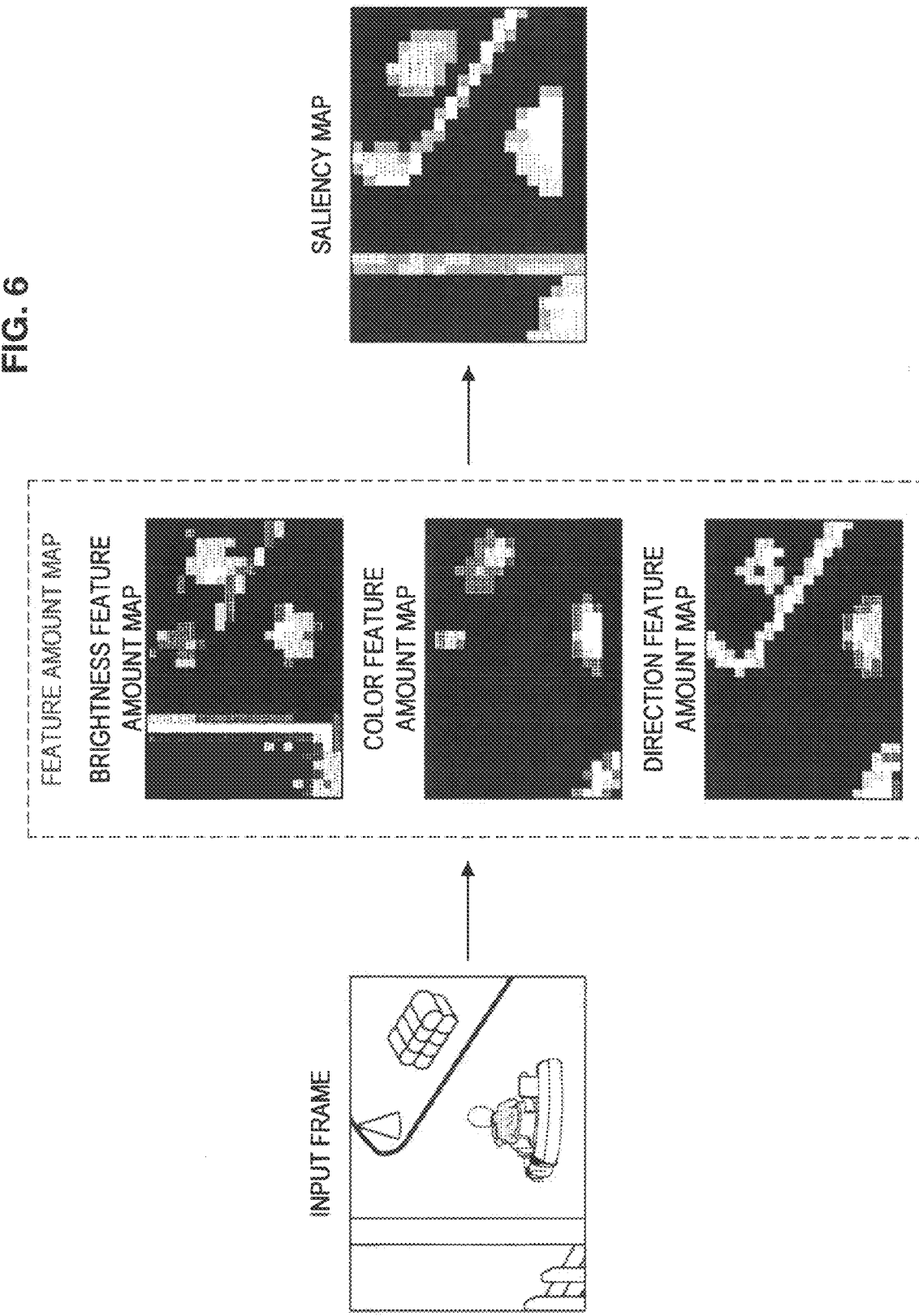
FIG. 6 is an explanatory view which illustrates a process that a saliency map generating unit generates a saliency map.

FIG. 6 is an explanatory view illustrating a process of the saliency map generating unit 220 to generate the saliency map. As illustrated in FIG. 6, the saliency map generating unit 220 generates plural types of feature amount maps from an input frame.

For example, the saliency map generating unit 220 generates a brightness feature amount map indicating brightness components of the input frame from the input frame. More specifically, the average value of an R-component value, a G-component value and a B-component value for each block of the input frame may be calculated as the brightness component of each block.

Similarly, the saliency map generating unit 220 generates a color feature amount map indicating color components of the input frame from the input frame. Further, the saliency map generating unit 220 generates a direction feature amount map indicating direction components of the input frame from the input frame.

In FIG. 6, the brightness feature amount map, the color feature amount map and the direction feature amount map are described as examples of the feature amount map. However, the feature amount map is not limited to the brightness feature amount map, the color feature amount map and the direction feature amount map. For example, the saliency map generating unit 220 may generate a variety of feature amount maps such as a blink feature amount map indicating blink components of the input frame and a motion feature amount map indicating motion components of the input frame.

The saliency map generating unit 220 generates the saliency map by unifying the plural types of feature amount maps generated as described above. For example, the saliency map generating unit 220 may perform weighting on each of the plural types of feature amount maps and may generate the saliency map by adding the respective weighted feature amount maps.

(Movement Detecting Unit 224)

The movement detecting unit 224 detects movement of the imaging apparatus 10 at the time of imaging each frame based on respective frames constituting the moving image supplied from the moving image memory unit 216. More specifically, the movement detecting unit 224 detects the movement of the imaging apparatus 10 based on difference between two sequential frames. In the following, the movement detection will be specifically described with reference to FIGS. 7 and 8.

FIG. 7 is an explanatory view illustrating two sequential frames. In FIG. 7, a frame L is the newer frame (i.e., the frame obtained later) and a frame L−1 is the older frame (i.e., the frame obtained earlier).

The movement detecting unit 224 performs movement prediction against the frame L for respective blocks constituting the frame L−1 and obtains a movement vector for each block. Then, the movement detecting unit 224 specifies a movement vector of the imaging apparatus 10 from the movement vectors excepting movement vectors which are largely different from a dominant direction out of movement vectors of all blocks.

In an example of FIG. 7, the position of the cart image does not vary from the frame L−1 to the frame L. However, the circuit course as the background image in the frame L−1 moves toward the lower right direction as a whole in the frame L. In this case, the movement detecting unit 224 specifies the movement vector of the imaging apparatus 10, for example, by averaging the movement vectors of the blocks constituting the circuit course except for the cart image.

Further, the movement detecting unit 224 determines a segment in which the imaging apparatus 10 is moving based on the scalar quantity of the movement vector (hereinafter, called the movement amount) of the imaging apparatus 10.

Figure 8:
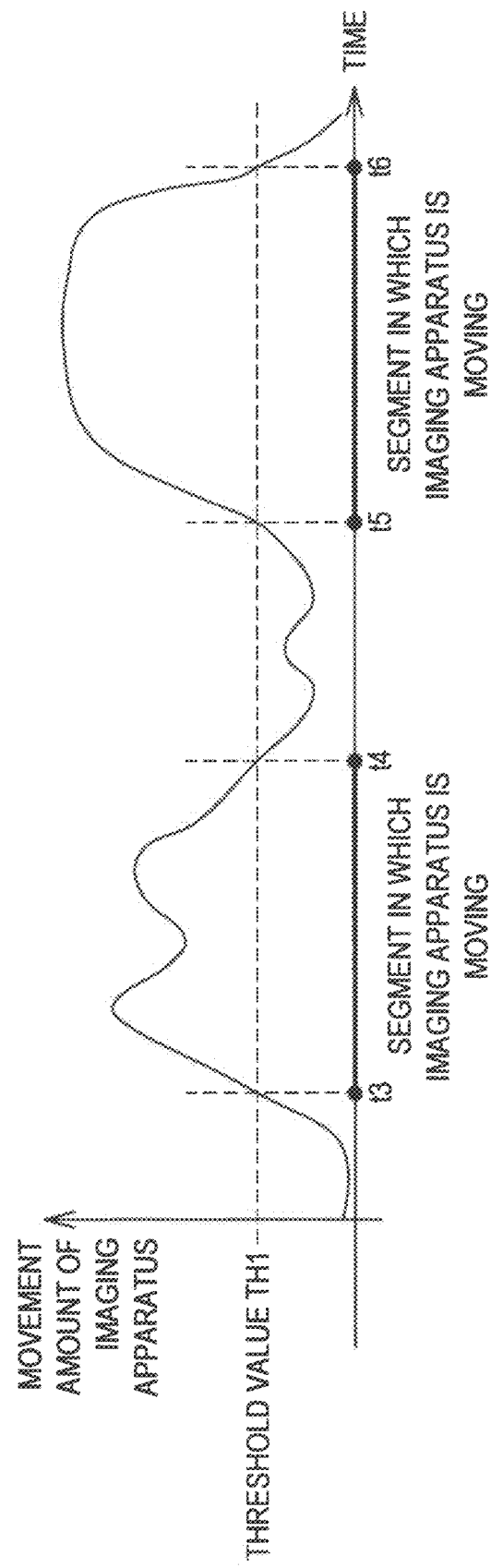
FIG. 8 is an explanatory view which illustrates a specific example of a segment in which an imaging apparatus is determined to be moving.

FIG. 8 is an explanatory view illustrating a specific example of the segment in which the imaging apparatus 10 is determined to be moving. As illustrated in FIG. 8, the movement detecting unit 224 determines a segment having larger movement amount of the imaging apparatus 10 than a threshold value th1 to be the segment in which the imaging apparatus 10 is moving. Specifically, in an example of FIG. 8, the movement amount of the imaging apparatus 10 exceeds the threshold value th1 at periods between time t3 and time t4 and between time t5 and time t6. Accordingly, the movement detecting unit 224 determines the segments between time t3 and time t4 and between time t5 and time t6 to be the segments in which the imaging apparatus 10 is moving.

(Moving Zone Detecting Unit 228)

The moving zone detecting unit 228 detects a moving zone where the moving object appears from respective frames constituting the moving image supplied from the moving image memory unit 216. Then, the object detecting unit 232 detects an object from the saliency map generated by the saliency map generating unit 220 within the moving zone detected by the moving zone detecting unit 228. Prior to detailed description, intention of arranging the moving zone detecting unit 228 will be described in the following.

Figure 9:
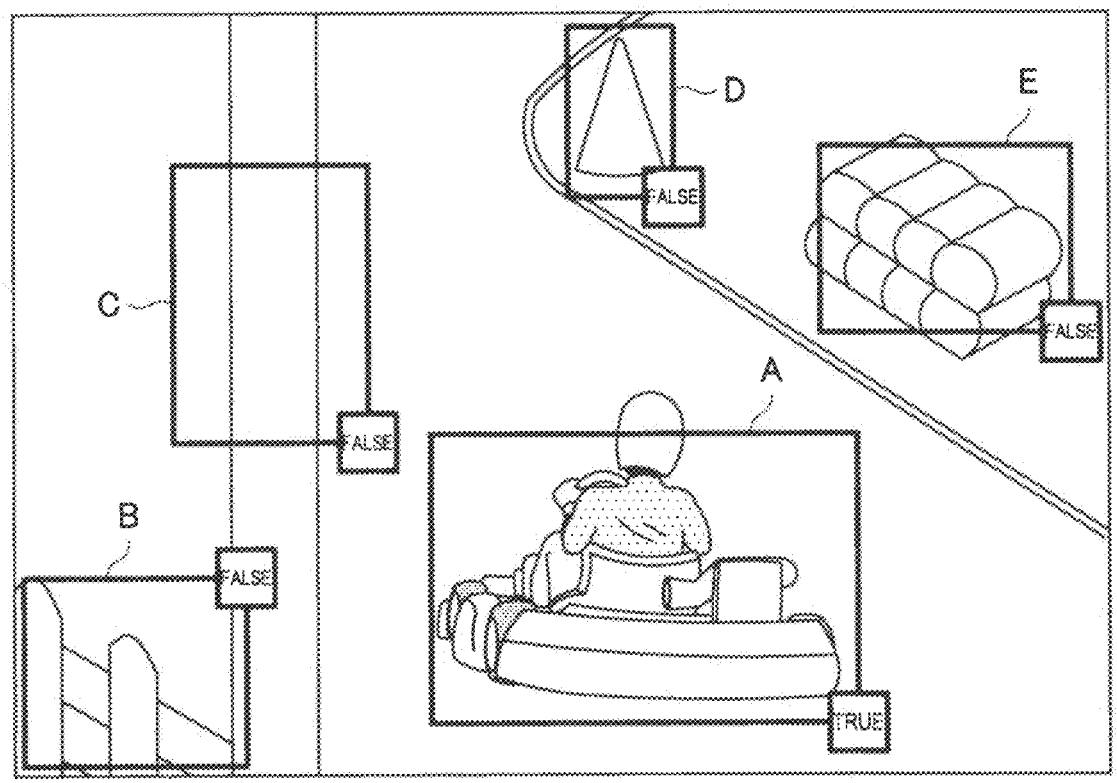
FIG. 9 is an explanatory view which illustrates an example of object detection from a frame.

FIG. 9 is an explanatory view illustrating an example of object detection from a frame. More specifically, FIG. 9 illustrates objects detected by the object detecting unit 232 in an example case that the objects are detected from the entire saliency map. As illustrated in FIG. 9, in addition to an object box A including the cart, entities on the circuit course are detected as object boxes B to E.

As described above, in the case of detecting objects, for example, from the entire saliency map by the object detecting unit 232, the object boxes B to E including motionless entities are detected as well in addition to the object box A including the moving cart. In the present embodiment, it is desired to extract the segment including the salient object imaged with chasing by the imaging apparatus 10. That is, since a moving object is assumed to be the salient object, the object boxes B to E including motionless entities are not appropriate as the salient object.

In order to suppress detection of an object box including a motionless entity as a candidate of the salient object, the moving zone detecting unit 228 is arranged at the image extracting apparatus 20. In the following, functions of the moving zone detecting unit 228 will be described with reference to FIG. 10.

Figure 10:
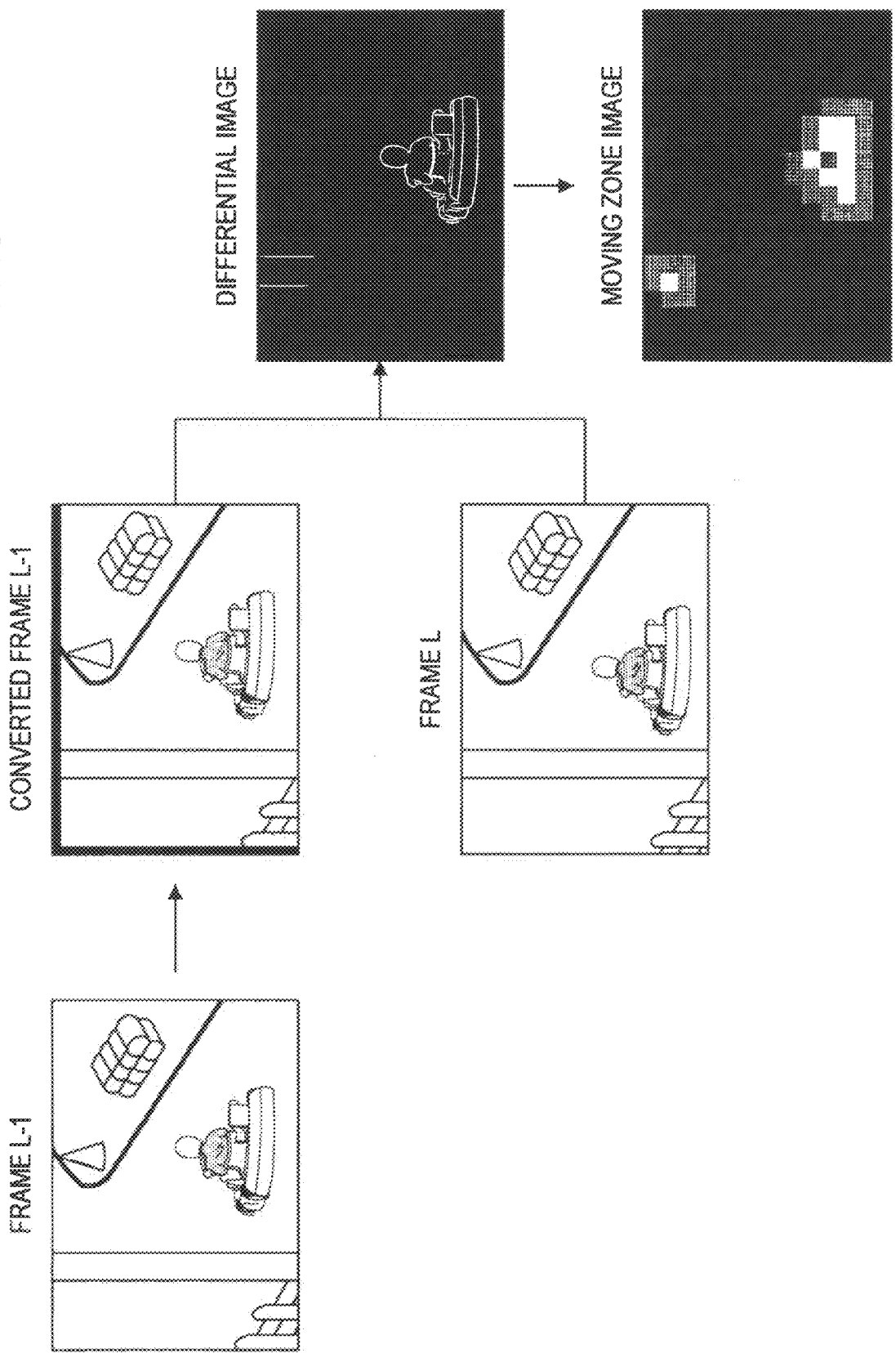
FIG. 10 is an explanatory view which illustrates a scene of moving zone detection from frames by a moving zone detecting unit.

FIG. 10 is an explanatory view illustrating a scene of moving zone detection from the frames by the moving zone detecting unit 228. As illustrated in FIG. 10, the moving zone detecting unit 228 converts the frame L−1 so as to cancel the movement vector of the imaging apparatus 10 detected by the movement detecting unit 224. For example, in the case that the movement vector of the imaging apparatus 10 is detected by the movement detecting unit 224 as the direction Q and the largeness R, the image in the frame L−1 is shifted in the direction of −Q by the largeness of R. Then, the moving zone detecting unit 228 generates a differential image between the frame L and the converted frame L−1.

Here, even for a motionless entity, the existing positions are different between the frame L and the frame L−1 due to the movement of the imaging apparatus 10. However, since the movement of the imaging apparatus 10 is cancelled in the frame L−1 after being converted, the existing positions of the motionless entity are considered to be approximately matched between the frame L and the converted frame L−1. Accordingly, as illustrated in FIG. 10, the cart being a moving object mainly appears as the difference between the frames in the differential image between the frame L and the converted frame L−1.

Further, as illustrated in FIG. 10, the moving zone detecting unit 228 obtains the moving zone image indicating the moving zone where the moving object exists by performing threshold processing on the brightness values of the differential image by the block. Here, in the moving zone image illustrated in FIG. 10, the zone having brightness corresponds to the moving zone.

(Object Detecting Unit 232)

The object detecting unit 232 detects an object box based on the saliency map generated by the saliency map generating unit 220 and the moving zone detected by the moving zone detecting unit 228. Assuming that the object detection unit 232 performs the object detection only based on the saliency map, motionless entities are also detected as the object boxes as described with reference to FIG. 9.

Meanwhile, since the object detection is performed from the moving zone detected by the moving zone detecting unit 228, the object detecting unit 232 of the present embodiment is capable of mainly detecting a moving entity as the object box.

For example, according to the object detecting unit 232 of the present embodiment, it is anticipated that only the object box A of the moving cart is detected among the object boxes A to E illustrated in FIG. 9. In this manner, the saliency map generating unit 220, the moving zone detecting unit 228 and the object detecting unit 232 function as a new object detecting unit to detect a new object.

(Managing Unit 236 and Information Memory Unit 240)

The managing unit 236 includes an information managing unit 254, a feature component selecting unit 256 and a comparing unit 258. The managing unit 236 manages object information of the object box detected by the object detecting unit 232 at the information memory unit 240. Here, an object ID, an appearance frame number, a disappearance frame number and the like may be considered as the object information.

For example, the information managing unit 254 allocates an object ID to a new object box which is not chased by the object chasing unit 244 among the object boxes detected by the object detecting unit 232 and stores the number of the frame where the object box is detected to the information memory unit 240 as the appearance frame number. Further, when the object box is not to be chased by the object chasing unit 244 at a frame, the information managing unit 254 stores the number of this frame as the disappearance frame number to the information memory unit 240.

Figure 11:
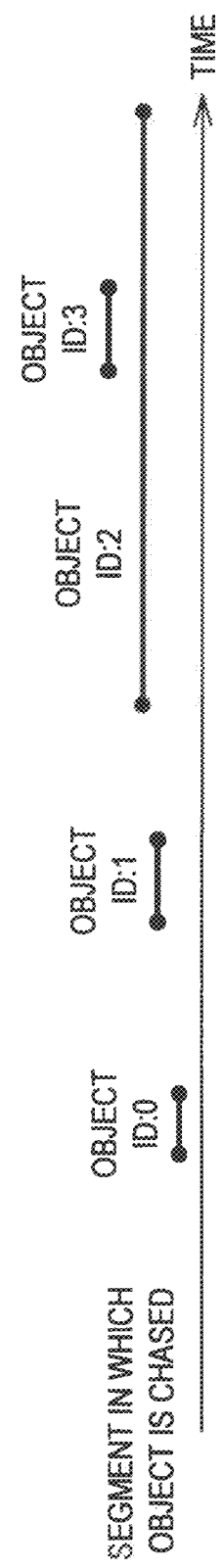
FIG. 11 is an explanatory view which schematically illustrates contents of object information managed by an information managing unit.

FIG. 11 schematically illustrates contents of the object information managed by the information managing unit 254 as described above. As illustrated in FIG. 11, the segments in which an object is respectively chased can be specified with the appearance frame number and the disappearance frame number.

Here, the information memory unit 240 may be a storage medium such as a non-volatile memory, a magnetic disk, an optical disk, a magneto-optical (MO) disk, as similar to the moving image memory unit 216. In FIG. 5, the moving image memory unit 216 and the information memory unit 240 are illustrated as separate blocks. However, the present embodiment is not limited to the above example. For example, the moving image memory unit 216 and the information memory unit 240 may be physically integrated into a single storage medium.

The feature component selecting unit 256 and the comparing unit 258 function as an identical object determining unit to determine identity between an object before occlusion occurrence and an object after occlusion occurrence in the case that occlusion occurs against the object. Here, occlusion and harmful influence thereof will be described with reference to FIG. 12.

Figure 12:
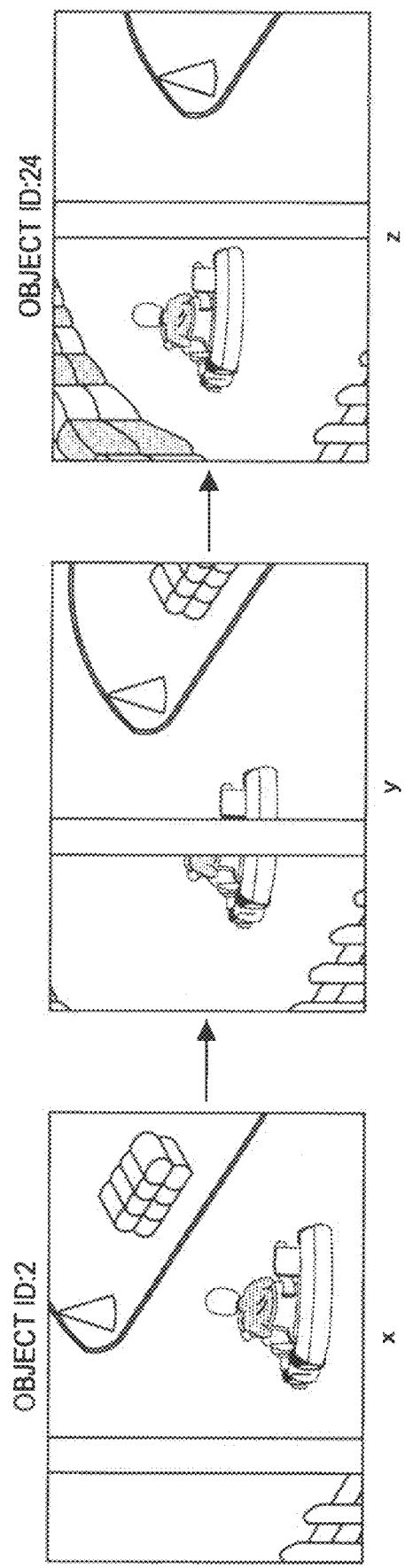
FIG. 12 is an explanatory view which illustrates a scene of occlusion occurrence.

FIG. 12 is an explanatory view illustrating a scene of occlusion occurrence. Occlusion denotes a state that an object at the back becomes invisible due to obstruction with an entity at the front. In an example of FIG. 12, the cart being an object becomes invisible due to obstruction with a pole at the front in a frame y and occlusion occurs.

When such occlusion occurs, it temporally becomes unable to chase the object. Accordingly, there may be a case that an identical object is treated as a different object. For example, in FIG. 12, an object ID of 2 is allocated to the object box of the cart included in a frame x. When occlusion occurs at the frame y, it becomes unable to chase the cart. Accordingly, there may be a case that the object box of the cart having the object ID of 2 is managed as being disappeared.

Then, when the object of the cart appears once again at a frame z after occlusion occurrence, there may be a case that an object ID being different from that before occlusion occurrence (in the example of FIG. 12, the object ID is 24) is allocated since the object of the cart is treated as a new object.

Meanwhile, according to the feature component selecting unit 256 and the comparing unit 258, it is possible to treat the object box before occlusion occurrence and the object box after occlusion occurrence as the identical object even when occlusion occurs. In the following, the feature component selecting unit 256 and the comparing unit 258 are described.

The feature component selecting unit 256 selects a feature component for comparison between an object box before occlusion occurrence and an object box after occlusion occurrence. More specifically, since a distinguishable feature component from another object box is different for each object box, the feature component selecting unit 256 selects a feature component being distinguishable for the object box with occlusion occurrence from another object box.

For example, in the feature amount map of FIG. 6, since the cart is strongly characteristic in the color feature amount map, the cart is distinguishable from another object. However, since the cart is not so characteristic in the brightness feature amount map and the direction feature amount map, the cart is not distinguishable from another object. In this case, the feature component selecting unit 256 selects, as the feature component for comparison, the color feature amount being distinguishable for the object box with occlusion occurrence from another object box. In the following, the feature component to be selected by the feature component selecting unit 256 will be described more specifically with reference to FIG. 13.

Figure 13:
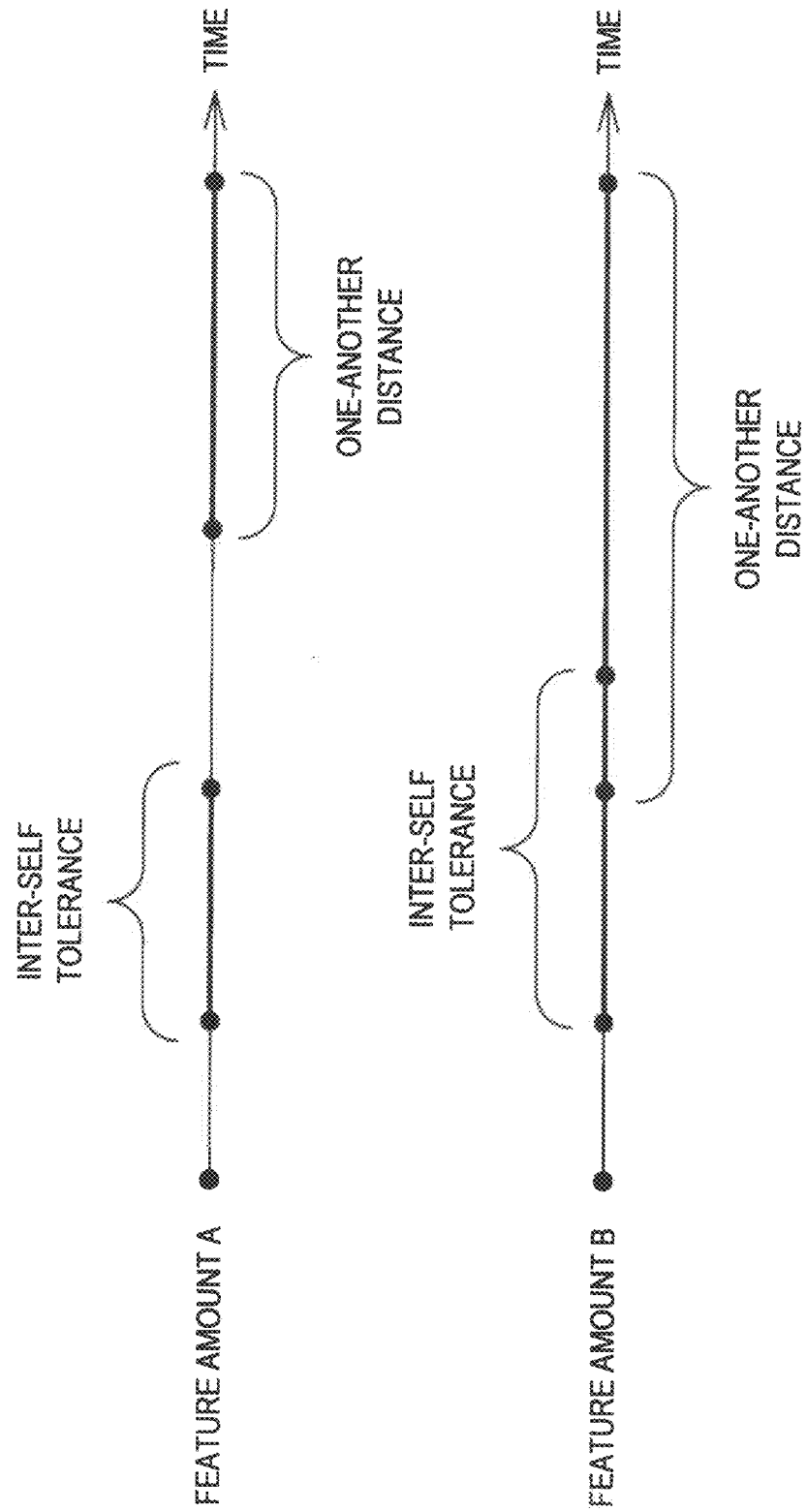
FIG. 13 is an explanatory view which illustrates a selection criterion of a feature component by a feature component selecting unit.

FIG. 13 is an explanatory view illustrating a selection criterion of the feature component by the feature component selecting unit 256. In FIG. 13, a tolerance of a certain object box (hereinafter, called the object box X) appearing in plural frames for a certain feature component among the plural frames is called as the inter-self tolerance. Further, a feature amount differential distance between the object box X and another object box in each frame is called as the one-another distance.

As illustrated in FIG. 13, the inter-self tolerance and the one-another distance does not overlap in a feature amount A for the object box X. Accordingly, in the case that a new object box of which feature amount differential distance from the object box X in the feature amount A is within the above inter-self tolerance is detected, the new object box is possible to be determined as being identical to the object box X. That is, it is possible to detect the object box X from a frame while distinguishing from another object box based on the feature amount A. Accordingly, the feature component selecting unit 256 selects the feature amount A as the feature component for comparison.

On the other hand, as illustrated in FIG. 13, the inter-self tolerance and the one-another distance overlap in a feature amount B for the object box X. In this case, there may be a possibility that a new object box is different from the object box X even when the feature amount differential distance in the feature amount B between the new object box and the object box X is within the range of the above inter-self tolerance. That is, it is difficult to detect the object box X from a frame while distinguishing from another object box based on the feature amount B. Accordingly, the feature component selecting unit 256 does not select the feature amount B as the feature component for comparison.

The comparing unit 258 measures the feature amount differential distance in the feature component selected by the feature component selecting unit 256 between the newly detected object box and the object box X disappeared at a past frame.

The information managing unit 254 manages the object information in accordance with the measurement result of the comparing unit 258. For example, in the case that the feature amount differential distance between a new object box and the object box X is smaller than a threshold value respectively in sufficient number (for example, two) of feature components, the information managing unit 254 may process the new object box as the object box X. Specifically, the information managing unit 254 may delete the disappearance frame number of the object box X at the information memory unit 240 and may allocate the same object ID as the object box X to the new object box.

Meanwhile, in the case that the number of feature components having small feature amount differential distance between the new object box and the object box X is not sufficient, the information managing unit 254 may process the new object box in a normal manner. Specifically, the information managing unit 254 may allocate a new object ID to the new object box.

(Object Chasing Unit 244)

The object chasing unit 244 detects and chases the object box detected in a frame in the next frame. That is, the object chasing unit 244 has a function as the object detecting unit to continuously detect an object box. Here, the Kanade-Lucas-Tomasi (KLT) method utilizing characteristic points can be adopted as a method for detecting and chasing, for example. The detailed processes of the object chasing unit 244 will be described later with reference to FIG. 17.

(Salient Object Selecting Unit 248)

The salient object selecting unit 248 selects the object imaged with chasing by the imaging apparatus 10 (i.e., the imaged object while being chased) as the salient object. Specifically, the salient object selecting unit 248 selects, as the salient object, the object box which is detected (chased) by the object chasing unit 244 over a period of the predetermined length (a threshold value th2) or longer within a segment in which the imaging apparatus 10 is determined to be moving by the movement detecting unit 224. In the following, a specific example of the salient object to be selected by the salient object selecting unit 248 will be described with reference to FIG. 14.

Figure 14:
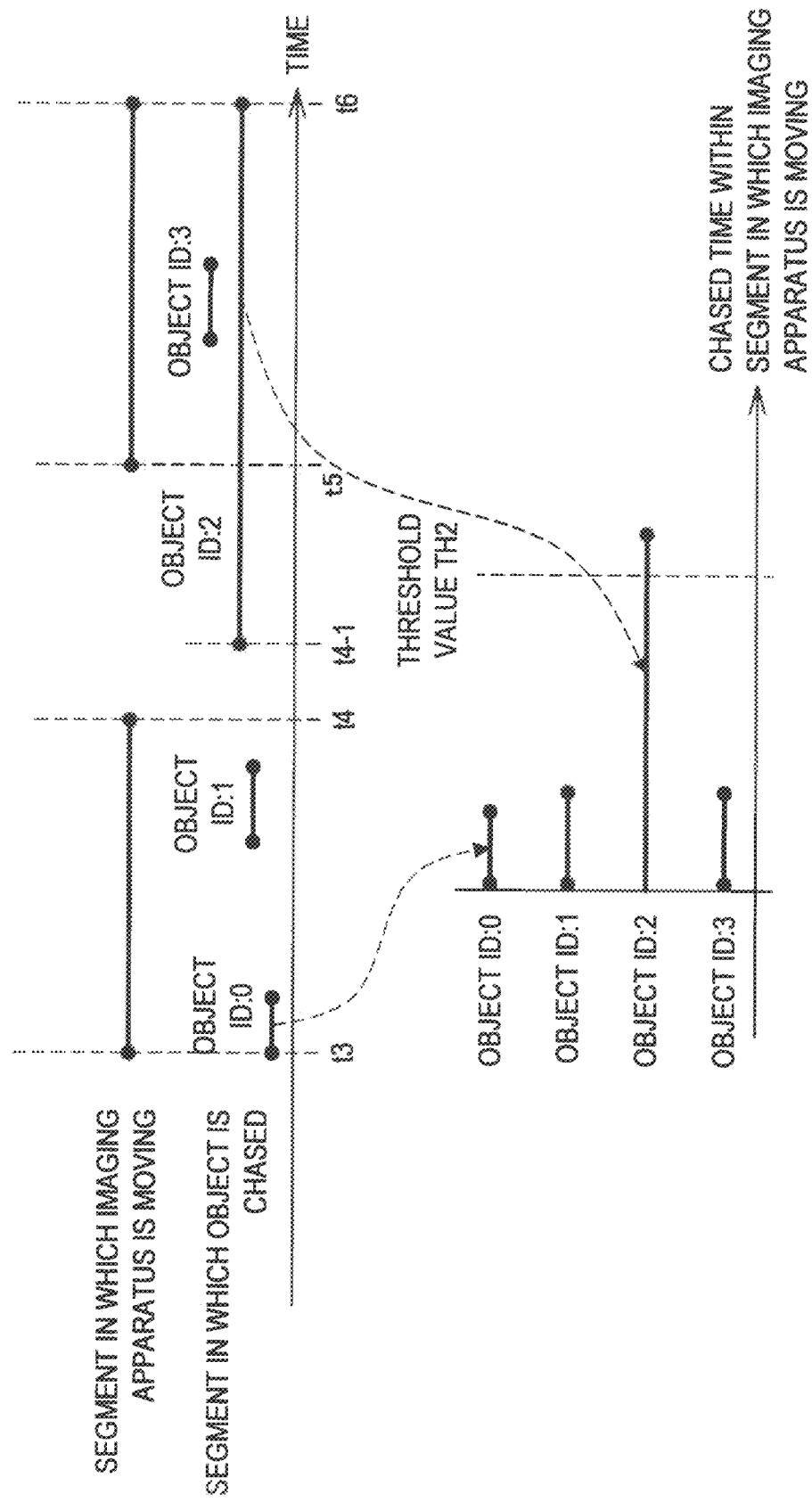
FIG. 14 is an explanatory view which illustrates a specific example of a salient object selected by a salient object selecting unit.

FIG. 14 is an explanatory view illustrating the specific example of the salient object to be selected by the salient object selecting unit 248. As illustrated in FIG. 14, the salient object selecting unit 248 obtains segment length in which each object box is chased during the periods between time t3 and time t4 and between time t5 and time t6 in which the imaging apparatus 10 is determined to be moving.

Then, the salient object selecting unit 248 selects, as the salient object, the object box having the segment length equal to or longer than the threshold value th2 chased during the period in which the imaging apparatus 10 is determined to be moving. Accordingly, in the example of FIG. 14, the object box having the object ID of 2 is selected as the salient object.

(Extracting Unit 252)

The extracting unit 252 extracts a segment including the salient object selected by the salient object selecting unit 248 from the moving image. Specifically, the extracting unit 252 obtains the segment in which the salient object is chased from the object information of the salient object and extracts a segment including at least a part of this segment from the moving image.

In the example of FIG. 14, the extracting unit 252 may extract the segment from time t4−1 to time t6 in which the salient object (having the object ID of 2) is chased, for example. Instead, the extracting unit 252 may extract the segment including a period before the salient object appears (for example, from time t4 to time t6) or may extract a part of the segment of a period in which the salient object is chased (for example, from time t5 to time t6).

Here, the salient object is the object imaged with chasing by the imaging apparatus 10. Accordingly, due to the above process of the extracting unit 252, it is possible to extract, from the moving image, a segment in which the object imaged with chasing by the imaging apparatus 10 appears.

3. OPERATION OF IMAGE EXTRACTING APPARATUS

In the above, the configuration of the image extracting apparatus 20 has been described with reference to FIGS. 4 to 14. Next, detailed operation of the image extracting apparatus 20 will be described with reference to FIGS. 15 to 18. Specifically, the operation of the movement detecting unit 224 will be described with reference to FIG. 15. The operation of the moving zone detecting unit 228 will be described with reference to FIG. 16. The operation of the object chasing unit 244 will be described with reference to FIG. 17, and then, the operation of the managing unit 236 will be described with reference to FIG. 18.

(3-1. Detecting Movement of Imaging Apparatus)

Figure 15:
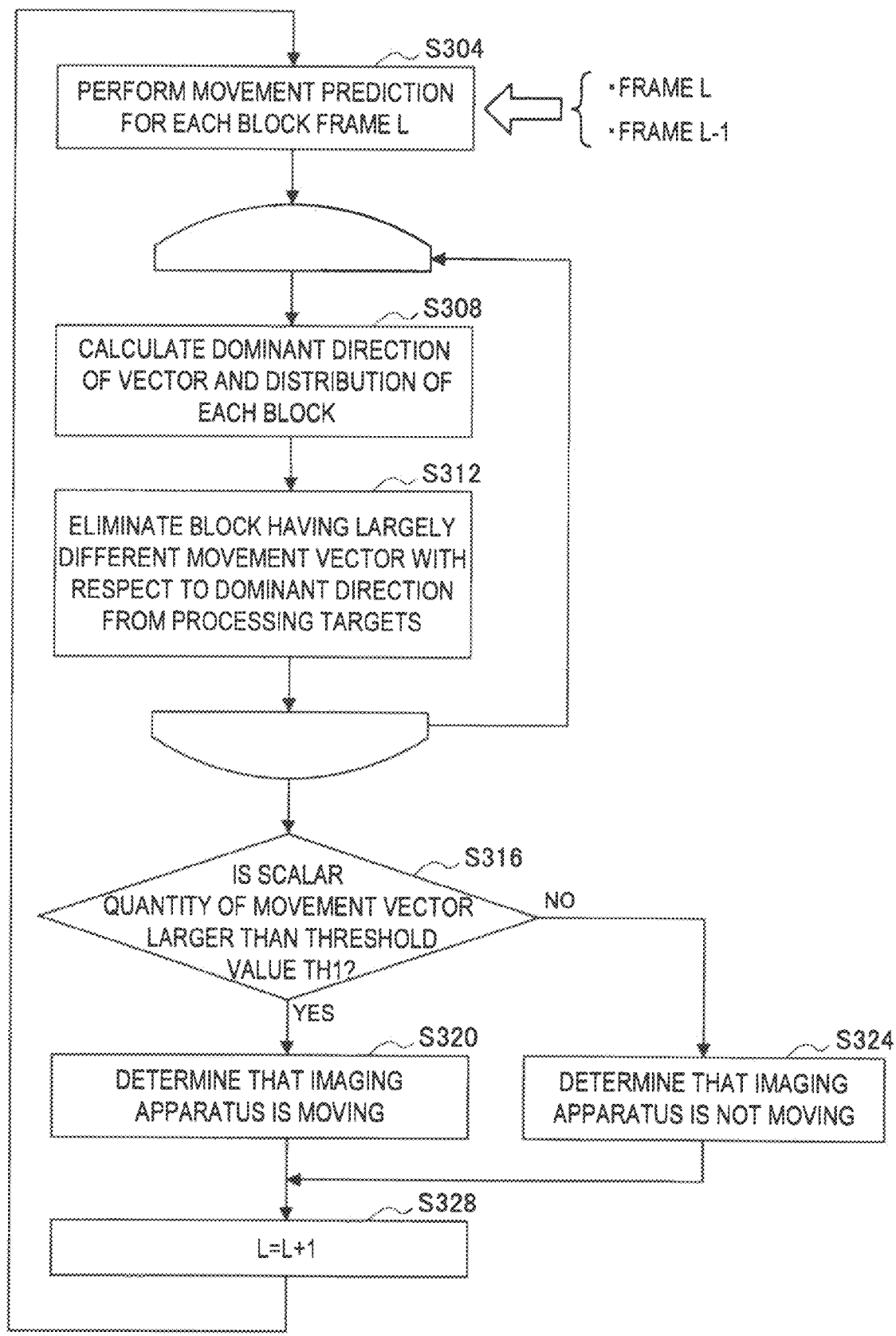
FIG. 15 is a flowchart which describes the flow of movement detection of the imaging apparatus by a movement detecting unit.

FIG. 15 is a flowchart describing the flow of movement detection of the imaging apparatus 10 by the movement detecting unit 224. The movement detecting unit 224 determines whether or not the imaging apparatus 10 is moving at the time of imaging each frame based on respective frames constituting the moving image supplied from the moving image memory unit 216.

Specifically, the movement detecting unit 224 receives the frame L and the frame L−1 being the next previous frame to the frame L and obtains the movement vector for each block by performing movement prediction against the frame L for each block constituting the frame L−1 (S304). Here, it is also possible to perform movement prediction against the frame L−1 for each block constituting the frame L so as to obtain the movement vector for each block.

Then, the movement detecting unit 224 calculates the dominant direction of the movement vector and distribution of the movement vector of each block with respect to the dominant direction from the movement vector of each block (S308). Subsequently, the movement detecting unit 224 eliminates, from targets to be processed, a block having the most different movement vector with respect to the dominant direction (S312).

The movement detecting unit 224 repeatedly performs the above processes of S308 and S312 until the distribution of the movement vector of each block with respect to the dominant direction becomes equal to or smaller than a threshold value. Accordingly, the movement vector at the frame L of the imaging apparatus 10 can be obtained.

Further, the movement detecting unit 224 determines whether or not the scalar quantity of the movement vector of the imaging apparatus 10 exceeds the threshold value th1 (S316). When the scalar quantity of the movement vector of the imaging apparatus 10 exceeds the threshold value th1, the movement detecting unit 224 determines that the imaging apparatus 10 is moving (S320). On the other hand, when the scalar quantity of the movement vector of the imaging apparatus 10 does not exceed the threshold value th1, the movement detecting unit 224 determines that the imaging apparatus 10 is not moving (S324).

By performing the above processes from S304 to S320 or from S304 to S324 on the subsequent frames (S328), the movement detecting unit 224 can determine whether or not the imaging apparatus 10 is moving at the time of imaging each frame.

(3-2. Detecting Moving Zone)

Next, the operation of the moving zone detecting unit 228 to detect a moving zone in frames will be described with reference to FIG. 16.

Figure 16:
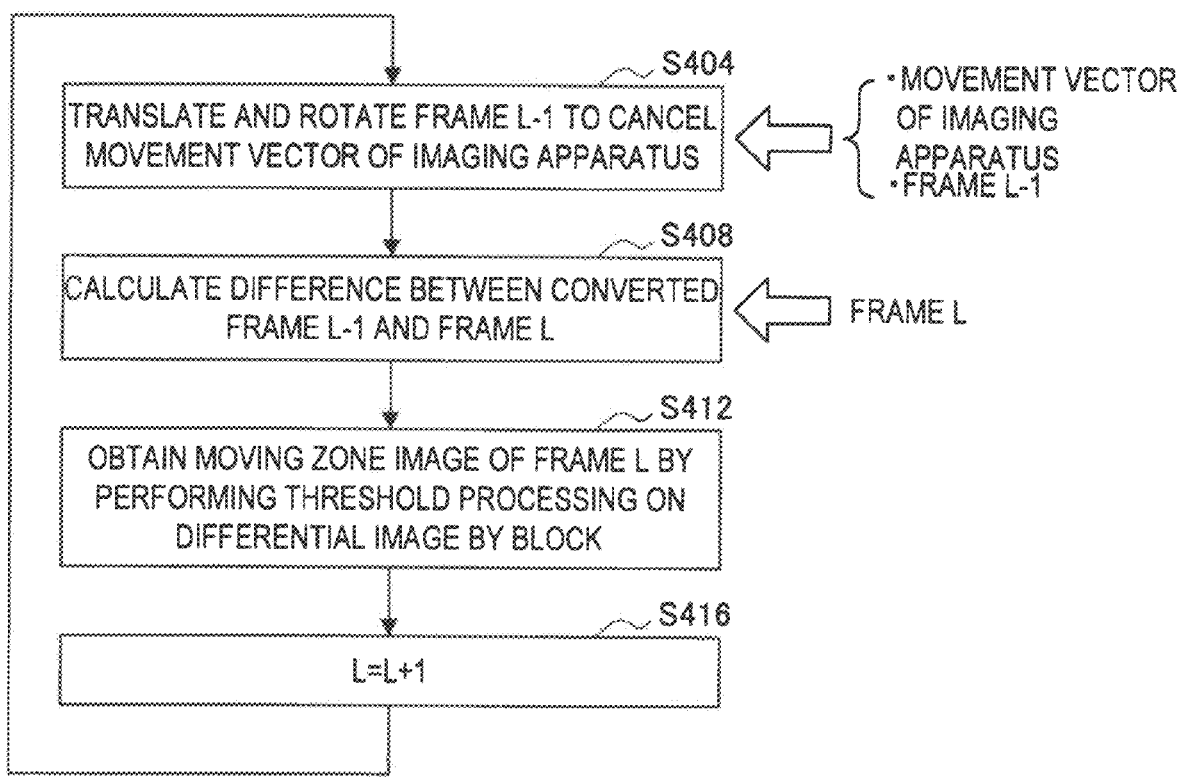
FIG. 16 is a flowchart which describes the flow of moving zone detection in frames by a moving zone detecting unit.

FIG. 16 is a flowchart describing the flow of moving zone detection in frames by the moving zone detecting unit 228. The moving zone detecting unit 228 detects the moving zone where a moving object appears from respective frames constituting the moving image supplied from the moving image memory unit 216.

Specifically, the moving zone detecting unit 228 receives the movement vector of the imaging apparatus 10 at the time of imaging the frame L from the movement detecting unit 224 and receives the frame L−1 from the moving image memory unit 216. The moving zone detecting unit 228 converts the frame L−1 supplied from the moving image memory unit 216 so as to cancel the movement vector of the imaging apparatus 10 by translating and rotating (S404).

Subsequently, the moving zone detecting unit 228 obtains the differential image by calculating the difference between the frame L supplied from the moving image memory unit 216 and the converted frame L−1 (S408). The differential image has brightness mainly at a part where the moving object exists.

Then, the moving zone detecting unit 228 obtains the moving zone image indicating the moving zone where the moving object exists by performing threshold processing on the brightness values of the differential image by the block (S412). Here, the object detecting unit 232 performs object detection from the moving zone detected by the moving zone detecting unit 228. Accordingly, the object detecting unit 232 is capable of detecting mainly the moving object as the object box due to the detection of the moving zone by the moving zone detecting unit 228.

Further, by performing the processes from S404 to S412 on the subsequent frames (S416), the moving zone detecting unit 228 can obtain the moving zone image indicating the moving zone where the moving object exists at each frame.

(3-3. Chasing Object)

Next, the operation of the object chasing unit 244 to chase the object detected at the previous frame will be described with reference to FIG. 17.

Figure 17:
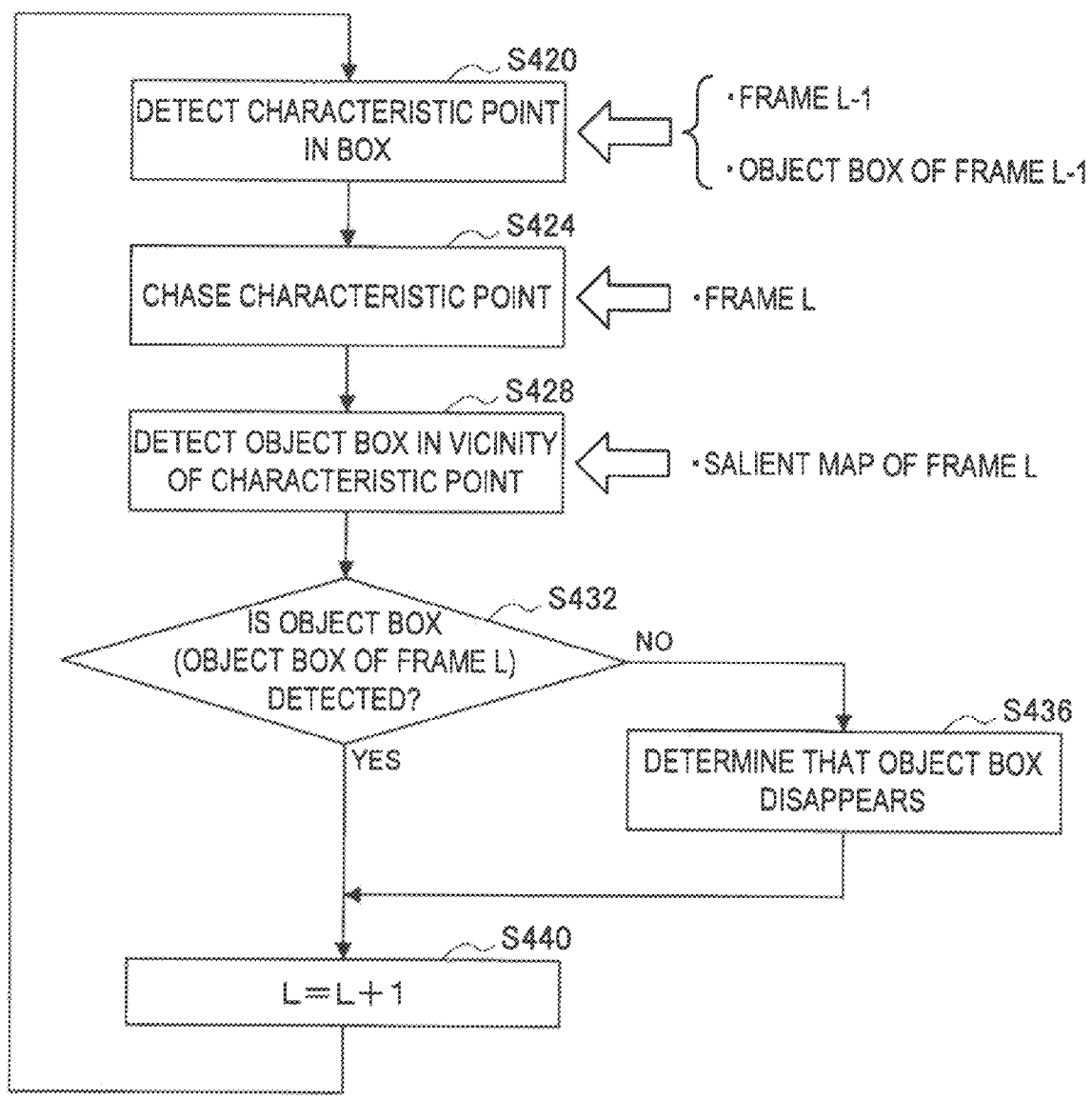
FIG. 17 is a flowchart which describes the flow of object chase by the object chasing unit.

FIG. 17 is a flowchart describing the flow of object chase by the object chasing unit 244. As illustrated in FIG. 17, the object chasing unit 244 receives the frame L−1 from the moving image memory unit 216. Further, the object chasing unit 244 receives the object box of a new object at the frame L−1 from the object detecting unit 232 and obtains the object box on a chase through the previous process by the object chasing unit 244.

The object chasing unit 244 obtains coordinates of a characteristic point within the object box by detecting the characteristic point within the object box from the frame L−1 and the object box of the frame L−1 (S420). Then, the object chasing unit 244 chases the characteristic point detected in S420 at the frame L supplied from the moving image memory unit 216 and obtains coordinates of the characteristic point at the frame L (S424).

Thereafter, the object chasing unit 244 attempts to detect the object box in the vicinity of the characteristic point obtained in S424 based on the saliency map of the frame L (S428). When the object box is detected, the object box is treated as the object box of the frame L (S432).

On the other hand, when the object box is not detected, the object chasing unit 244 determines that the object box disappears (S436). Here, when the object box is determined to disappear by the object chasing unit 244, the information managing unit 254 stores the frame L as the disappearance frame number of the object box.

Further, by performing the processes from S420 to S432 or from S420 to S436 on the subsequent frames (S440), the object chasing unit 244 can chase the object box over plural frames.

(3-4. Process of Supporting Occlusion)

Next, the flow of processes of the managing unit 236 to remedy harmful influence of occlusion will be described with reference to FIG. 18.

FIG. 18 is a flowchart describing the flow of the processes to support occlusion by the managing unit 236. As illustrated in FIG. 18, the object chasing unit 244 performs the chase process of the object box (S444). When the object box is not detected at the frame L (S448), there is a possibility that the object box temporally disappears due to occlusion. Accordingly, in order to determine identity between the object box appearing after occlusion and the disappeared object box, the feature component selecting unit 256 and the comparing unit 258 perform selecting of the feature component to be used for the determination and comparing to determine.

Specifically, the feature component selecting unit 256 calculates the inter-self tolerance and the one-another distance for each feature component of the disappeared object box from each feature amount map of the past frames by the amount of n frames being the frame L−1 and before (S452).

Accordingly, the inter-self tolerance and the one-another distance can be obtained for each feature component.

Here, as described above, the tolerance of the disappeared object box for a certain feature component among the plural frames is the inter-self tolerance. The feature amount differential distance between the disappeared object box and another object box in each frame is the one-another distance.

Subsequently, the feature component selecting unit 256 selects the feature component from the plural types of feature components so that the inter-self tolerance and the one-another distance do not overlap (S456). Then, when the feature components are selected in sufficient number (for example, three) or more (S460), the comparing unit 258 performs the process described at the right side of the flowchart.

After the object box of the frame L+1 is detected based on the frame L+1 and the saliency map thereof, the comparing unit 258 eliminates the chased object box from the frame L (S464). Accordingly, the object box which is newly detected (including after occlusion) at the frame L+1 can be obtained.

Thereafter, the comparing unit 258 measures the feature amount differential distance against the disappeared object box in each feature component selected by the feature component selecting unit 256 for the object box which is newly detected at the frame L+1 (S468). When the number of the feature components with the feature amount differential distance between the object box newly detected at the frame L+1 and the disappeared object box being equal to or smaller than the threshold value is equal to or more than the predetermined number (S472), the information managing unit 254 allocates the same object ID as the disappeared object box to the object box newly detected at the frame L+1 (S476).

On the other hand, when the number of the feature components with the feature amount differential distance between the object box newly detected at the frame L+1 and the disappeared object box being equal to or smaller than the threshold value is fewer than the predetermined number, the information managing unit 254 allocates a new object ID to the object box newly detected at the frame L+1 and performs processing as a new object (S480).

Then, by repeating the processes from S464 to S480 on the subsequent frames (S484), the object box with occlusion occurring over plural frames can be also appropriately processed. Here, since occlusion is a state occurring temporally, it is also possible to set an upper limit of the number of frames at which the comparison between the disappeared object box and the newly detected object is performed.

4. SUMMARY

As described above, the image extracting apparatus 20 according to an embodiment of the present invention selects the object box detected over a period of the predetermined length or longer within the segment in which movement of the imaging apparatus 10 is detected as the salient object. Further, the image extracting apparatus 20 extracts the moving image segment including the salient object from the moving image. Accordingly, by utilizing the image extracting apparatus 20, a user can obtain an attractive moving image segment for the user including the salient object which is imaged with chasing by the imaging apparatus 10.

Further, the image extracting apparatus 20 according to another embodiment of the present invention includes the moving zone detecting unit 228 to detect the moving zone where the moving object exists in a frame and the object detecting unit 232 to detect an object box as a salient object candidate from the moving zone detected by the moving zone detecting unit 228. With this configuration, it is possible to suppress detecting an object box including motionless entity as the salient object candidate.

Further, the image extracting apparatus 20 according to another embodiment of the present invention can appropriately support even when occlusion occurs. Specifically, the feature component selecting unit 256 of the image extracting apparatus 20 selects the feature component which is distinguishable between a disappeared object box and another object box when the object box on a chase disappears. Then, the comparing unit 258 compares a newly detected object box and the disappeared object box in the feature component selected by the feature component selecting unit 256. Further, the information managing unit 254 allocates the same object ID as the disappeared object box to the newly detected object box when the feature amount differential distance is equal to or smaller than the threshold value. In this manner, the object box with occlusion occurrence can be treated as being detected and chased during disappearance from frames.

It should be understood by those skilled in the art that various modifications, combinations, sub-combinations and alterations may occur depending on design requirements and other factors insofar as they are within the scope of the appended claims or the equivalents thereof.

For example, in the above embodiment, the feature component selecting unit 256 is exemplified to select the feature component in which the inter-self tolerance and the one-another distance do not overlap. However, the present invention is not limited to the above example. For example, in a case that the inter-self tolerance and the one-another distance overlap in all feature components, the feature component selecting unit 256 may preferentially select a feature component having less overlap between the inter-self tolerance and the one-another distance.

Further, in the description of the example of the above embodiment, the movement detecting unit 224 determines that the imaging apparatus 10 is moving when the movement amount of the imaging apparatus 10 exceeds the threshold value th1. However, the present invention is not limited to the above example. For example, when the period in which the movement amount of the imaging apparatus 10 is equal to or smaller than the threshold value th1 is equal to a predetermined length or shorter, the movement detecting unit 224 may determine that the imaging apparatus 10 is moving including the period. Specifically, in the example of FIG. 8, when the period between time t4 and time t5 is equal to the predetermined length or shorter, the movement detecting unit 224 may determine that the imaging apparatus 10 is moving from time t3 to time t6.

Further, the above embodiment exemplifies that the respective frames constituting the moving image are processed. Here, the salient object selecting unit 248 selects, as the salient object, the object box chased over a period of the predetermined length or longer by the object chasing unit 244 within the segment in which the imaging apparatus 10 is determined to be moving by the movement detecting unit 224. Therefore, the object chasing unit 244 performs chasing during the segment in which the imaging apparatus 10 is determined to be moving by the movement detecting unit 224 while being not required to perform chasing in the rest of segments. Similarly, the saliency map generating unit 220, the moving zone detecting unit 228, the object detecting unit 232 and the like perform processing during the segment in which the imaging apparatus 10 is determined to be moving by the movement detecting unit 224 while being not required to perform processing in the rest of segments. With this configuration, the processing load for extracting a moving image can be lightened at the moving image extracting apparatus 20 while obtaining substantial effects of the moving image extracting apparatus 20.

Further, in the description of the above embodiment, the information managing unit 254 performs processing on a new object box as the object box X disappeared due to occlusion when the feature amount differential distance between the new object box and the object box X is smaller than the threshold value in sufficient number of the feature components. However, the present invention is not limited to the above example. For example, when the feature amount differential distance between the new object box and the object box X is smaller than the threshold value in at least one feature component, the information managing unit 254 may perform processing on the new object box as the object box X disappeared due to occlusion.

For example, each step in the processes of the moving image extracting apparatus 20 herein is not necessarily performed in time sequence in order described in the flowchart. For example, each step of the processes of the moving image extracting apparatus 20 may include a process which is serially performed and a process which is separately performed.

Further, it is also possible to prepare a computer program to exert functions similar to the hardware such as the CPU 201, the ROM 202 and the RAM 203 incorporated in the moving image extracting apparatus 20. Here, a storage medium storing the computer program may be provided. Further, a series of processes can be performed with hardware by constituting respective functional blocks in the functional block diagram in FIG. 5 with hardware.

The present application contains subject matter related to that disclosed in Japanese Priority Patent Application JP 2009-176575 filed in the Japan Patent Office on Jul. 29, 2009, the entire content of which is hereby incorporated by reference.

What is claimed is:

1. A moving image extracting apparatus comprising:
circuitry configured to
detect, based on a moving image imaged by an imaging apparatus, movement of the imaging apparatus at a time in which the imaging apparatus captured the moving image;
generate a saliency map that is a unification of a plurality of feature maps, each feature map indicating an amount of a different feature in the moving image;
detect, upon detection of movement of the imaging apparatus, a plurality of moving objects from the moving image using the saliency map;
obtain a tracking segment length for each of the moving objects
select as a salient object, in accordance with the saliency, a moving object from the plurality of moving objects having a tracking segment length equal to or longer than a threshold value within the segment in which movement of the imaging apparatus is detected; and
extract a segment including the salient object from the moving image.

2. The moving image extracting apparatus according to claim 1, wherein the circuitry is configured to detect the movement of the imaging apparatus based on the difference between two sequential frames among frames constituting the moving image and obtains a movement vector corresponding to the movement of the imaging apparatus.

3. The moving image extracting apparatus according to claim 2, wherein the circuitry is configured to:

convert a first frame being one of the two sequential frames by canceling the movement vector of the imaging apparatus from the first frame; and
detect each of the moving objects through a differential part between a second frame being the other frame of the two sequential frames and the first frame after being converted.

4. The moving image extracting apparatus according to claim 3, wherein the circuitry is further configured to:
compare an object newly detected and an object disappeared in a past frame; and
determine whether or not both of the objects are identical, wherein
an object which is determined to be identical is treated as being detected during the period of disappearance as well.

5. The moving image extracting apparatus according to claim 4, wherein the circuitry is further configured to:
select a feature component corresponding to the object disappeared in the past frame; and
compare the newly detected object and the object disappeared in the past frame in the feature component.

6. The moving image extracting apparatus according to claim 5, wherein the circuitry is further configured to select a feature component distinguishable for the object from another object in plural frames before disappearance of the object among plural types of feature components.

7. A non-transitory computer readable storage medium having instructions stored therein, which when executed by a processor in a computer causes the processor to:
detect, based on a moving image imaged by an imaging apparatus, movement of the imaging apparatus at a time in which the imaging apparatus captured the moving image;
generate a saliency map that is a unification of a plurality of feature maps, each feature map indicating an amount of a different feature in the moving image;
detect, upon detection of movement of the imaging apparatus, a plurality of moving objects from the moving image using the saliency map;
obtain a tracking segment length for each of the moving objects;
select as a salient object, in accordance with the saliency, a moving object from the plurality of moving objects having a tracking segment length equal to or longer than a threshold value within the segment in which movement of the imaging apparatus is detected; and
extract a segment including the salient object from the moving image.

8. A moving image extracting method, comprising:
detecting, based on a moving image imaged by an imaging apparatus, movement of the imaging apparatus at a time in which the imaging apparatus captured the moving image;
generating a saliency map that is a unification of a plurality of feature maps, each feature map indicating an amount of a different feature in the moving feature;
detecting, upon detection of movement of the imaging apparatus, a plurality of moving objects from the moving image;
obtaining a tracking segment length for each of the moving objects;
selecting, as a salient object, in accordance with the saliency, a moving object from the plurality of moving objects having a tracking segment length equal to or longer than a threshold value within the segment in which movement of the imaging apparatus is detected; and extracting a segment including the salient object from the moving image.

\* \* \* \* \*